(12) United States Patent
Izumi et al.

(10) Patent No.: US 10,680,301 B2
(45) Date of Patent: Jun. 9, 2020

(54) METAL-AIR BATTERY AND PROTECTED LITHIUM ELECTRODE USED THEREIN

(71) Applicant: Suzuki Motor Corporation, Hamamatsu-shi (JP)

(72) Inventors: Hiroaki Izumi, Hamamatsu (JP); Hironari Minami, Hamamatsu (JP)

(73) Assignee: Suzuki Motor Corporation (JP)

( * ) Notice: Subject to any disclaimer, the term of this patent is extended or adjusted under 35 U.S.C. 154(b) by 129 days.

(21) Appl. No.: 16/113,709

(22) Filed: Aug. 27, 2018

(65) Prior Publication Data

US 2019/0067766 A1 Feb. 28, 2019

(30) Foreign Application Priority Data

Aug. 29, 2017 (JP) .................................. 2017-164226

(51) Int. Cl.
*H01M 2/14* (2006.01)
*H01M 4/02* (2006.01)
*H01M 12/08* (2006.01)

(52) U.S. Cl.
CPC ............. *H01M 12/08* (2013.01); *H01M 2/14* (2013.01); *H01M 4/02* (2013.01); *H01M 2300/0025* (2013.01)

(58) Field of Classification Search
CPC .......... H01M 2/14; H01M 4/02; H01M 12/08; H01M 2300/0025
See application file for complete search history.

(56) References Cited

U.S. PATENT DOCUMENTS

| | | |
|---|---|---|
| 2010/0266901 A1 | 10/2010 | Johnson |
| 2012/0321968 A1 | 12/2012 | Sato et al. |
| 2015/0140398 A1* | 5/2015 | Yamazaki ........... H01M 2/1686 429/127 |

FOREIGN PATENT DOCUMENTS

| | | |
|---|---|---|
| JP | 2009054712 A | 3/2009 |
| JP | 2011146339 A | 7/2011 |

(Continued)

OTHER PUBLICATIONS

Exam Report for Application No. 201844023563, dated Feb. 14, 2020, 5 pages.

*Primary Examiner* — Brittany L Raymond
(74) *Attorney, Agent, or Firm* — Lerner, David, Littenberg, Krumholz & Mentlik, LLP

(57) ABSTRACT

A metal-air battery and a protected anode used therein, which make it possible to prevent the metal such as Li being an anode active material and formed into fine powder from dispersing away from the anode layer, and to improve charging and discharging cycle characteristics, even in the case of a charging and discharging cycle over a long period of time. For example, a protected anode 1 includes an anode current collector 32; an anode layer 33 which is stacked on an air electrode side of the anode current collector and which includes a metal being an anode active material of a metal-air battery; a first separator 34 which is stacked on the air electrode side of the anode layer and which includes multiple pores permeable to ions of the metal and an organic electrolytic liquid; and a second separator 40 which is provided on the air electrode side of the first separator so as to be movable relative to the first separator in an inter-electrode direction and which includes multiple pores permeable to the metal ions and the organic electrolytic liquid. In addition, the protected anode may be used to fabricate a metal-air battery.

14 Claims, 6 Drawing Sheets

(56) References Cited

FOREIGN PATENT DOCUMENTS

| | | |
|---|---|---|
| JP | 2013020724 A | 1/2013 |
| JP | 2015122295 A | 7/2015 |
| WO | 2017187888 A1 | 11/2017 |

* cited by examiner

⊢⊣ 10μm

⊢⊣ 10μm

⊢⊣ 10μm

METAL-AIR BATTERY AND PROTECTED LITHIUM ELECTRODE USED THEREIN

CROSS-REFERENCES TO RELATED APPLICATION

The present application claims priority from Japanese Patent Application No. 2017-164226, filed Aug. 29, 2017, the disclosure of which is hereby incorporated herein by reference.

TECHNICAL FIELD

The present invention relates to a metal-air battery and a protected lithium electrode used therein.

BACKGROUND ART

A metal-air battery uses a metal such as lithium as an anode active material and uses oxygen in the atmosphere as a cathode active material, and is expected, thanks to its high energy density, as a battery capable of obtaining an energy density of 700 Wh/kg required for widespread use and standardization of electric automobiles. This energy density is seven times greater than those of lithium-ion batteries which are presently beginning to be mounted in vehicles.

Patent Document 1 discloses an internal structure of a protected anode of a metal-air battery is provided, as a buffer layer, with a porous resin sheet, for example a separator for a lithium-ion battery (a sheet of porous polyethylene, polypropylene, cellulose, or the like) impregnated with a non-aqueous electrolytic liquid and the like or a protection layer made of a polymer electrolyte and the like in order to prevent direct contact between a solid electrolyte (glass ceramics) and a Li anode. However, there is a problem that if Li deposited on the anode at the time of charging is formed into a fine powder and is dispersed, it becomes impossible to retain Li near the anode current collector and Li does not contribute to charging and discharging, resulting in a decrease in charging and discharging characteristics.

In addition, as disclosed in Patent Document 2, there is a method of suppressing dendrites by maintaining a uniform distance between the cathode and the anode, in which a metal foil laminate material having a high air-tightness is used as an exterior material of the metal-air battery, an air inlet is provided at a position not facing the held surface of the electrode assembly, and a uniform pressure is applied on the cathode. However, even when the dendrite can be suppressed, it is difficult to retain Li at the time of charging near the anode current collector, leaving a problem of how to improve the charging and discharging characteristics.

Moreover, a Li-ion capacitor disclosed in Patent Document 3 has a structure in which both surfaces of a metal Li plate are covered by two separators and end portions of the separators are melted and bonded to seal the metal Li plate. Thus, in the process of pre-doping at an early stage of cell fabrication, the metal Li plate dissolves after the injection of an electrolytic liquid and is dispersed in the electrolytic liquid as Li ions. Here, free small fragments of Li metal are prevented from flowing into the cell, resulting in the prevention of the deterioration in characteristics attributed to e.g. short circuiting.

Patent Document

[Patent Document 1] JP 2015-122295 A
[Patent Document 2] JP 2013-020724 A
[Patent Document 3] JP 2009-054712

SUMMARY OF INVENTION

It has been recognized that on the anode side of the metal-air battery, as the charging and discharging cycles are repeated, a dendrite of a metal such as Li being an anode active material is deposited on the surface of the anode current collector, and moreover the dendrite is broken into fine powder and is dispersed inside the protected anode. In that situation, the metal such as Li dispersed as described above does not contribute to charging and discharging. Thus, there arises a problem that the charging and discharging characteristic of the metal-air battery decreases. In addition, in a non-aqueous solution-based metal-air battery, when this metal such as Li formed into fine powder reaches the cathode, there may be a risk of internal short circuiting between the cathode and the anode. On the other hand, in an aqueous solution-based metal-air battery, when the metal such as Li formed into fine powder reaches a solid electrolyte, there may be a risk of deterioration of the solid electrolyte.

In light of the above, a sack-shaped structure has been proposed, in which the anode layer of metal Li is wrapped by Li-ion-passing material such as a separator. This makes it possible to prevent Li formed into fine powder from dispersing inside the protected anode and thus to improve the charging and discharging cycle characteristic, even when the charging and discharging cycles are repeated.

Further, it has been recognized that in the case of a charging and discharging cycle over a long period of time, even when the anode layer described above has a sack-shaped structure, a small amount of the metal such as Li being an anode active material and formed into fine powder passes through and out of the sack-shaped structure.

In view of the problem described above, the present technology aims to provide a metal-air battery and a protected anode used therein, which make it possible to prevent the metal such as Li being an anode active material and formed into fine powder from dispersing away from the anode layer, and thus to further improve a charging and discharging cycle characteristic, even in the case of a charging and discharging cycle over a long period of time.

For the purpose of achieving the above object, an aspect of the present technology is a protected anode for a metal-air battery, and this protected anode includes: an anode current collector; an anode layer which is stacked on an air electrode side of the anode current collector and which includes a metal being an anode active material of a metal-air battery; a first separator which is stacked on the air electrode side of the anode layer and which includes multiple pores permeable to ions of the metal and an organic electrolytic liquid; and a second separator which is provided on the air electrode side of the first separator so as to be movable relative to the first separator in an inter-electrode direction and which includes multiple pores permeable to the metal ions and the organic electrolytic liquid. Note that the "inter-electrode direction" means a direction from the anode to the air electrode or a reverse direction thereof. Additionally, "movable" means that a portion of the second separator can move, for example come into contact with or detach from the first separator.

The anode layer is preferably sealed with the anode current collector and the first separator.

The second separator may be provided at a distance from the first separator.

At least some of the multiple pores in the second separator are preferably provided at positions not in alignment with the multiple pores in the first separator.

It is preferable to further include a resin sheet which is stacked on an opposite side of the anode current collector from the air electrode and which is resistant to the organic electrolytic liquid.

A solid electrolyte may further be included on the air electrode side of the second separator. In this case, the second separator preferably includes at least one opening portion which allows gas to pass therethrough. Note that this opening portion functions as a gas outlet for inert gas such as argon which might mix during the manufacture of the protected anode or the metal-air battery, and also functions as an inlet for an organic electrolytic liquid in the case of using the protected anode or the metal-air battery.

The configuration may be such that the anode layer is stacked on either side of the anode current collector, the first separator is stacked on an outer side of each of these two anode layers, the second separator is provided on an outer side of each of these two first separators, and the protected anode further includes a solid electrolyte on an outer side of each of these two second separators.

In a different aspect, the present technology is a metal-air battery, and this metal-air battery includes: the protected anode described above; and an air electrode. In the case of a non-aqueous solution-based metal-air battery, the configuration may be such that an organic electrolytic liquid is provided between the anode current collector of the protected anode and the air electrode. In addition, in the case of an aqueous solution-based metal-air battery, the configuration may be such that the protected anode includes a solid electrolyte, an organic electrolytic liquid in a space between the anode current collector of the protected anode and the solid electrolyte, and an aqueous solution-based electrolyte in a space between the solid electrolyte and the air electrode.

In a protected anode for a metal-air battery according to the present technology, a protected anode includes: an anode current collector; an anode layer which is stacked on an air electrode side of the anode current collector and which includes a metal being an anode active material of a metal-air battery; a first separator which is stacked on the air electrode side of the anode layer and which includes multiple pores permeable to ions of the metal and an organic electrolytic liquid; and a second separator which is provided on the air electrode side of the first separator so as to be movable relative to the first separator in an inter-electrode direction and which includes multiple pores permeable to the metal ions and the organic electrolytic liquid. As a result, it is possible to suppress metal fine powder being an anode active material and produced from the anode layer from passing through the second separator because a pressure is unlikely to be applied to the second separator even when the metal fine powder passes through the first separator due to the increase in pressure inside the first separator, more specifically because a pressure relieving space is created between the first separator and the second separator. Thus, it is possible to keep metal fine powder being an anode active material near the anode current collector even in the case of a charging and discharging cycle over a long period of time. Hence, the charging and discharging cycle characteristics can be improved.

The configuration in which the anode layer is sealed with the anode current collector and the first separator makes it possible to prevent metal fine powder being an anode active material and produced from the anode layer from easily passing through the second separator. Thus, it is possible to keep more metal fine powder near the anode current collector and to further improve the charging and discharging cycle characteristics.

The configuration in which the second separator is provided at a distance from the first separator makes it possible to provide a sufficient pressure relieving space between the first separator and the second separator and to more reliably prevent metal fine powder from passing through the second separator.

The configuration in which at least some of the multiple pores in the second separator are provided at positions not in alignment with the multiple pores in the first separator makes it possible to prevent metal fine powder having passed through the pores in the first separator from directly passing through the pores in the second separator. Thus, it is possible to more reliably block metal fine powder at the second separator.

The configuration in which a solid electrolyte is further included on the air electrode side of the second separator and in which the second separator includes an opening which allows gas to pass therethrough makes it possible to prevent stagnation of gas, which enters during the manufacture of the protected anode, in a region between the solid electrolyte and the second separator. Thus, it is possible to suppress the increase in the internal resistance of the cell and to prevent reduction in the charging and discharging cycle characteristic. Moreover, it is possible to improve yield because it is unnecessary to take into consideration such stagnation of gas during the manufacture.

The configuration to further include a resin sheet which is stacked on an opposite side (in other words, the back surface) of the anode current collector from the air electrode and which is resistant to the organic electrolytic liquid makes it possible to prevent metal being an anode active material from depositing on the back surface of the anode current collector at the time of charging and discharging. Thus, it is also possible to suppress formation of metal fine powder. Additionally, the strength and the stiffness of the anode current collector can be enhanced. Hence, it is possible to improve the durability of the anode current collector at the time of charging and discharging and at the same time to improve workability during fabrication of the protected anode.

The configuration in which the anode layer is stacked on either side of the anode current collector, the first separator is stacked on an outer side of each of these two anode layers, and the second separator is provided on an outer side of each of these two first separators makes it possible to fabricate a metal-air battery having a structure to provide an air electrode on either side of one protected anode for sealing in the container. It is possible to reduce the volume compared to a metal-air battery having a structure to provide one air electrode a surface of which faces a surface of one protected anode for sealing in the container.

The protected anode according to the present technology can be used both in a non-aqueous solution-based metal-air battery and in an aqueous solution-based metal-air battery. A metal-air battery according to the present technology includes the protected anode described above and an air electrode and is capable of further improving the charging and discharging cycle characteristic. In a non-aqueous solution-based metal-air battery, it is possible to suppress metal being an anode active material and formed into fine powder from reaching the cathode and to suppress short circuiting between the cathode and the anode. In an aqueous solution-based metal-air battery, it is possible to suppress metal being an anode active material and formed into fine powder from reaching the solid electrolyte and to suppress deterioration of the solid electrolyte.

Hereinafter, with reference to the attached drawings, a description is provided for an embodiment of a protected anode for a metal-air battery according to the present technology and the metal-air battery using the same. Note that although the description is provided for the case of a metal-air battery having an anode active material made of lithium, the present technology is not limited to this. The same effects can be obtained in the case of a metal-air battery having an anode active material made of a different metal such as zinc.

FIRST EMBODIMENT

Figure 1:
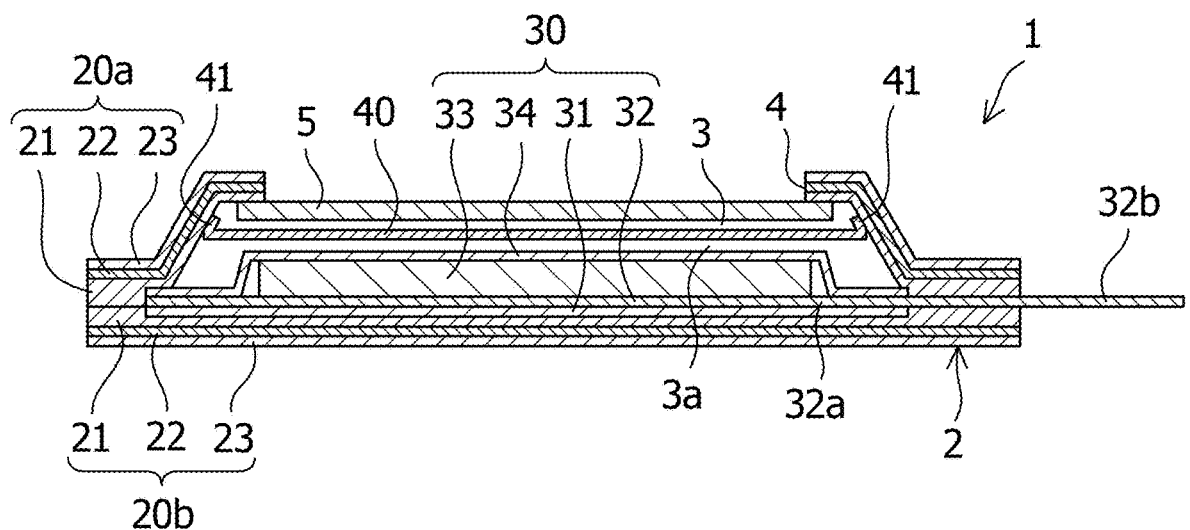
FIG. 1 is a cross-sectional view schematically illustrating a protected anode for a metal-air battery according to a first embodiment.
Figure 2:
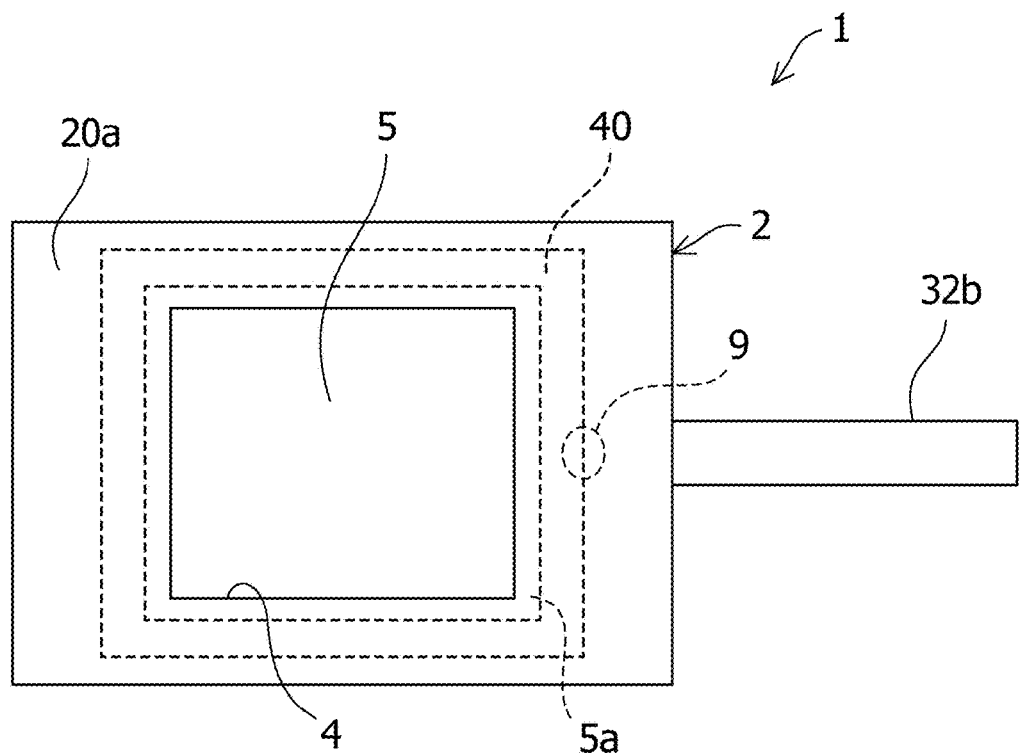
FIG. 2 is a plan view schematically illustrating the protected anode for a metal-air battery depicted in FIG. 1.

First, by use of FIG. 1 and FIG. 2, a description is provided for a protected anode for an aqueous solution-based lithium-air battery according to a first embodiment. As illustrated in FIG. 1, a protected anode 1 according to the first embodiment has a stacked structure in which two metal foil laminate films 20a and 20b provided on the upper and lower sides in FIG. 1 sandwich an isolation layer 5 being a solid electrolyte, a second separator 40, and an anode stacked body 30. The metal foil laminate film 20a located near the air electrode (illustration is omitted) of the metal-air battery has an opening portion 4 provided at a position substantially in the center in a plan view.

The metal foil laminate film 20a having the opening portion 4 is a sheet formed by stacking three layers of a first resin layer 21, a metal foil layer 22, and a second resin layer 23 in the order from the inner side to the outer side of the protected anode 1 (in the figure, from the lower side to the upper side). Likewise, the other metal foil laminate film 20b is a sheet formed by stacking three layers of the first resin layer 21, the metal foil layer 22, and the second resin layer 23 in the order from the inner side to the outer side of the protected anode 1 (in the figure, from the upper side to the lower side). Peripheral edge portions of the two metal foil laminate films 20a and 20b are joined to each other by heat sealing. Thus, an exterior body 2 is formed.

The first resin layer 21 can employ, for example, polyolefin-based resins such as a polypropylene resin and a polyethylene resin. These resins make it possible to easily manufacture the protected anode 1 because they have a low melting point and are suitable for heat sealing due to ease of heat processing.

The metal foil layer 22 is provided for the purpose of improving a gas barrier property and strength. For example, metal foil such as aluminum foil, SUS foil, and copper foil can be used.

The second resin layer 23 can employ, for example, polyester-based resins such as a polyethylene terephthalate resin, and nylon-based resins. These resin materials are excellent in heat resistance and strength. Hence, it is possible to improve the strength and the like of the protected anode 1.

Note that although each of the metal foil laminate films 20 has a three-layer structure in the first embodiment, the structure may have four or more layers in which one or more resin films such as nylon films are stacked between the layers.

The opening portion 4 of the metal foil laminate film 20a has the shape of a quadrangle in a plan view, as illustrated in FIG. 2. In addition, the isolation layer 5 is provided on the inner side of the metal foil laminate film 20a so as to close the opening portion 4. To be more specific, the size of the isolation layer 5 in a plan view is larger than the opening portion 4 of the metal foil laminate film 20, and the peripheral edge portion 5a of the isolation layer 5 is sealed and secured to the inner peripheral edge portion of the opening portion 4 of the metal foil laminate film 20a.

The isolation layer 5 is a solid electrolyte and is permeable to metal ions being an anode active material such as lithium ions when a voltage is applied. As the solid electrolyte, it is possible to use glass ceramics and the like which has an excellent lithium ion conductivity and is nonflammable. In addition, in the case of using an aqueous solution-based electrolytic liquid as the electrolytic liquid in particular, it is possible to use an LTAP-based glass ceramics electrolyte having a high water resistance. The LTAP is an oxide which has a NASICON-type crystal structure and is made up of Li, Ti, Al, P, Si, O, and the like.

The second separator 40 and the anode stacked body 30 are provided between the other metal foil laminate film 20b without an opening portion and the isolation layer 5 in the order from the isolation layer 5 side. The edges of the four sides of the anode stacked body 30 are sandwiched, sealed, and secured by the upper and lower metal foil laminate films 20a and 20b.

The anode stacked body 30 has a structure in which four layers of a film 31, an anode current collector 32, an anode layer 33 made of metal lithium, and a first separator 34 are stacked in the order from the metal foil laminate film 20b without an opening portion. The configuration is such that the edges of the four sides of the first separator 34 are sealed and secured to the anode current collector 32, thereby sealing the anode layer 33 by use of the anode current collector 32 and the first separator 34. Note that the first separator 34 is not secured to the anode layer 33.

The first separator 34 has multiple pores which allow metal ions being an anode active material such as lithium ions and an organic electrolytic liquid to pass therethrough. As the first separator 34 described above, it is possible to use, for example, a sheet made of cellulose, polyolefin-based resins such as porous polyethylene and polypropylene used as a separator for a lithium-ion battery, and the like. In addition to these materials, it is possible to use materials such as aramid having a porous structure, polytetrafluoroethylene, and aluminum oxide having a capillary structure. Moreover, it is possible to use a sheet of these materials impregnated with an organic electrolytic liquid.

As the material of the first separator 34, it is possible to use a material having a porosity of about 40% to 90% and a thickness of about 10 to 300 μm, more preferably about 15 to 100 μm. The size of the pore may be about 20 nm to 500 nm and more preferably about 20 to 70 nm. In addition, the first separator 34 itself preferably has stiffness and strength to some extent.

As illustrated in FIG. 1 and FIG. 2, the anode current collector 32 includes a collector portion 32a sandwiched by the film 31 and the anode layer 33, and a terminal portion 32b extending from the collector portion 32a to the outside of the exterior body 2. The collector portion 32a of the anode current collector 32 has the shape of a quadrangle in a plan view, and the terminal portion 32b has a linear shape narrower than the collector portion 32a. The collector portion 32a of the anode current collector 32 is joined to the first separator 34 such that the entire collector portion 32a is covered by the first separator 34, including the edge portions of the four sides.

The material of the anode current collector 32 may be a material which is stable in the operating range of the metal-air battery and which has a desired conductivity. Examples include copper, nickel, and the like.

As described earlier, the anode layer 33 is sealed between the first separator 34 and the anode current collector 32. For this reason, the size of the anode layer 33 in a plan view is smaller than that the first separator 34. In addition, the position of the anode layer 33 within the protected anode 1 in a plan view is located at a position almost corresponding to the position of the isolation layer 5 in a plan view.

As described above, the anode active material of the anode layer 33 may be a metal other than lithium and may employ a metal such as zinc. Lithium is more preferable from the viewpoint that it is practical thanks to a high open circuit voltage. In addition, the anode active material is not limited to metal lithium but may be an alloy or a compound containing lithium as a main component. Alloys having lithium as a main component may contain magnesium, calcium, aluminum, silicon, germanium, tin, lead, antimony, bismuth, silver, gold, zinc, and the like. Examples of the compounds having lithium as a main component include $Li_{3-x}M_xN$ (M=Co, Cu, Ni).

The film 31 covers the entire back surface of the collector portion 32a of the anode current collector 32. Note that the film 31 may be joined to the entire back surface of the collector portion 32a or may be joined to only the peripheral edge portion. In addition, the film 31 may cover not only the entire surface but also the lateral surfaces (edge portions) of the anode current collector 32. As the film 31, it is possible to use resin sheets and the like which are impermeable to organic electrolytic liquids and which are resistant to organic electrolytic liquids, for example polypropylene and polyethylene.

The second separator 40 has edges 41 of the four sides joined by heat sealing to the inner side of the metal foil laminate film 20a having the opening portion 4. In addition, as illustrated in FIG. 2, if a portion of the edge of the second separator 40 is not joined to the metal foil laminate film 20a, it is possible to provide an opening 9 which allows gas to communicate between the space between the first separator 34 and the second separator 40, and the space between the second separator 40 and the isolation layer 5. In the process of manufacturing the protected anode 1, there is a possibility that gas enters the space between the second separator 40 and the isolation layer 5, and the gas stagnates therein. If this opening 9 is provided, it is possible to suppress the formation of the stagnant gas.

Additionally, as illustrated in FIG. 1, the second separator 40 is provided at a distance both from the isolation layer 5 and the first separator 34 of the anode stacked body 30. Moreover, an organic electrolytic liquid and the like are stored in the space 3 between the two metal foil laminate films 20a and 20b having the opening portion 4 closed by the isolation layer 5.

As the material of the second separator 40, it is possible to use the same material as the first separator 34 described above. In addition, the conditions of the porosity, the thickness, and the size of the pore may be the same as those of the first separator 34.

Figure 3:
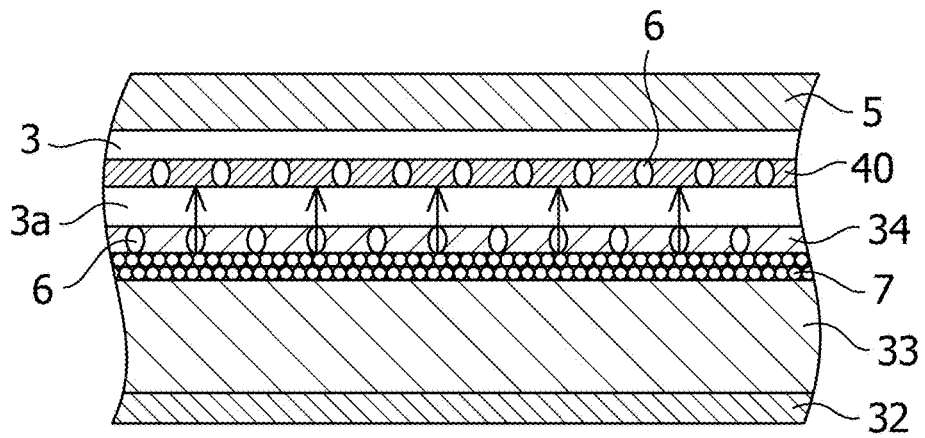
FIG. 3 is a cross-sectional view illustrating an enlarged portion of the protected anode for a metal-air battery depicted in FIG. 1.

The positions of the pores 6 in the first separator 34 and the positions of the pores 6 in the second separator 40 are generally provided not to be in alignment with each other, as illustrated in FIG. 3. In addition, as described above, the only joined portion of the second separator 40 is the peripheral edge portion, and second separator 40 is provided so as to be movable relative to the first separator 34 in the inter-electrode direction.

Examples of the organic electrolytic liquid include a carbonate ester-based organic solvent such as PC (propylene carbonate), EC (ethylene carbonate), DMC (dimethyl carbonate), and EMC (ethyl methyl carbonate), and the like, an ether-based organic solvent such as EGDME (ethylene glycol dimethyl ether), tetraethylene glycol dimethyl ether, and triethylene glycol dimethyl ether, and a mixture solvent thereof added with an electrolyte such as $LiPF_6$ (lithium hexafluorophosphate), $LiClO_4$ (lithium perchlorate), $LiBF_4$ (lithium tetrafluoroborate), LiTFSI (lithium bis(trifluoromethanesulfonyl)imide), and LiFSI (lithium bis(fluorosulfonyl)imide).

Other than the organic electrolytic liquid, it is possible to use a solid electrolyte which is a polymer containing a lithium salt dispersed therein or a gel electrolyte which is a polymer swollen by an organic electrolytic liquid containing a lithium salt dissolved therein. Examples of the lithium salt include $LiPF_6$, $LiClO_4$, $LiBF_4$, LiTFSI ($LiN(SO_2CF_3)_2$), LiFSI ($LiN(SO_2F))_2$, LiBOB (lithium bis(oxalato)borate), and the like.

Examples of the polymer serving as the host of the gel electrolyte include PEO (polyethylene oxide), PPO (polypropylene oxide), PVA (polyvinyl alcohol), PAN (polyacrylonitrile), PVP (polyvinylpyrrolidone), PEO-PMA (cross-linking product of polyethylene oxide-modified polymethacrylate), PVdF (polyvinylidene fluoride), PVA (polyvinyl alcohol), PAA (polyacrylic acid), PVdF-HFP (copolymer of polyvinylidene fluoride and hexafluoropropylene), and the like.

Such a configuration improves the charging and discharging cycle characteristic because, as illustrated in FIG. 1, the anode layer 33 has a structure enclosed by the first separator 34 and it is possible to prevent dispersion of Li fine powder from the anode layer 33 into the protected anode 1. However, when the volume of Li formed into fine powder (reference sign 7 in FIG. 3) and produced inside the first separator 34 becomes large through charging and discharging cycles over a long period of time and the pressure inside the first separator 34 increases, a small amount of Li formed into fine powder passes through the first separator 34. When this reaches the isolation layer 5, there arises a problem that the solid electrolyte of the isolation layer 5 deteriorates and the cell is broken.

Since the present embodiment provides the second separator 40 between the first separator 34 and the isolation layer 5, Li formed into fine powder has to pass through the pores 6 in the first separator 34 and then further pass through the pores 6 in the second separator 40 in order to come into contact with the solid electrolyte. In particular, since the second separator 40 is provided so as to be movable relative to the first separator 34 in the inter-electrode direction as described above, a pressure is unlikely to be applied to the second separator 40 unlike the first separator 34. Thus, it is difficult for Li powder to leak from the second separator 40 and it is possible to suppress the deterioration of the solid electrolyte to a great extent. Additionally, since the pores 6 of the first separator 34 and the second separator 40 are not in alignment with each other, it is difficult for the Li formed into fine powder to pass through the pores 6 of the second separator 40. This further reduces the probability that the Li powder comes into contact with the solid electrolyte.

Here, in FIG. 1, a space is provided between the first separator 34 and the second separator 40. As described above, the second separator 40 is provided so as to be movable relative to the first separator 34 in the inter-electrode direction. For this reason, even when the second separator 40 is provided next to the first separator 34, there is a pressure relieving space (reference sign 3a in FIG. 3) between the first separator 34 and the second separator 40, making it unlikely that a pressure is applied to the second separator 40. Therefore, it is possible to prevent leakage of Li powder from the second separator 40.

SECOND EMBODIMENT

Figure 4:
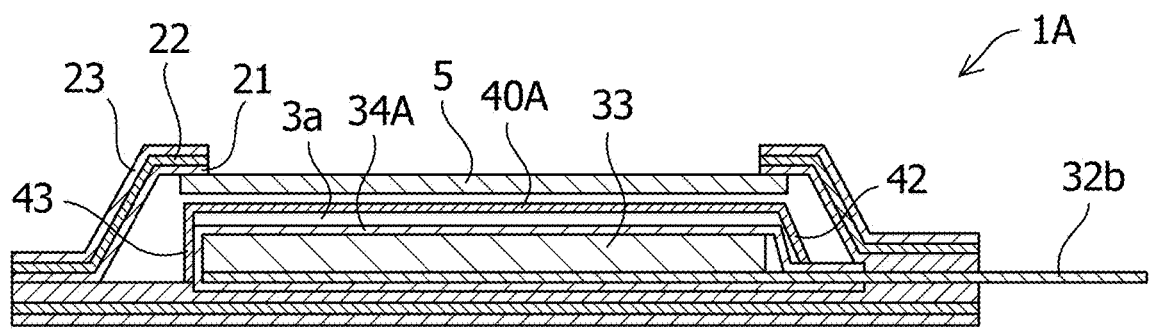
FIG. 4 is a cross-sectional view schematically illustrating a protected anode for a metal-air battery according to a second embodiment.

With reference to FIG. 4, a description is provided for a protected anode for an aqueous solution-based lithium-air battery according to a second embodiment. Note that since the present second embodiment is a modified example of the first embodiment (FIGS. 1 to 3), different points are described in detail while omitting overlapping explanation by giving the same numbers to the same components in the drawings.

As illustrated in FIG. 4, a protected anode 1A of the second embodiment has a structure in which a first separator 34A stacked on the air electrode side of the anode layer 33 is folded back toward the side opposite to the air electrode of the anode layer 33 (in other words, the back surface) at the edges of three sides of the anode layer 33. Moreover, instead of the film 31 of FIG. 1, the first separator 34A covers the entire surface of the collector portion 32a of the anode current collector 32.

The peripheral edge portion of the second separator 40A is joined by heat sealing to the first separator 34A at a portion located on the outer peripheral side of the anode layer 33 in a plan view. For example, as illustrated in FIG. 4, the peripheral edge portion 42 of the second separator 40A is joined to the first separator 34A at a portion in which the first separator 34A is directly joined to the anode current collector 32. In addition, the peripheral edge portion 43 of the second separator 40A is joined to the first separator 34A at a portion in which the first separator 34A is directly joined to the lateral side of the anode layer 33.

Such a configuration makes it possible to effectively retain a metal such as Li being an anode active material on the surface of the anode current collector 32 at the time of charging and discharging because, first of all, the first separator 34A has a structure folded back to the back surface of the anode current collector 32 and joined to the anode current collector 32. For this reason, it is possible to suppress formation of fine powder of the metal being an anode active material followed by dispersion inside the protected anode 1A, and to further improve the charging and discharging cycle characteristic.

Moreover, because of the configuration in which the peripheral edge portion of the second separator 40A is joined to the peripheral edge portion of the first separator 34A, the second separator 40A is movable relative to the first separator 34A in the inter-electrode direction in a region in which the anode layer 33 is located in a plan view. Hence, a pressure relieving space 3a is provided between the first separator 34A and the second separator 40A, making it unlikely that a pressure is applied to the second separator 40A. Therefore, it is possible to suppress leakage of metal fine powder from the second separator 40A and to obtain the same effects as the first embodiment.

THIRD EMBODIMENT

Figure 5:
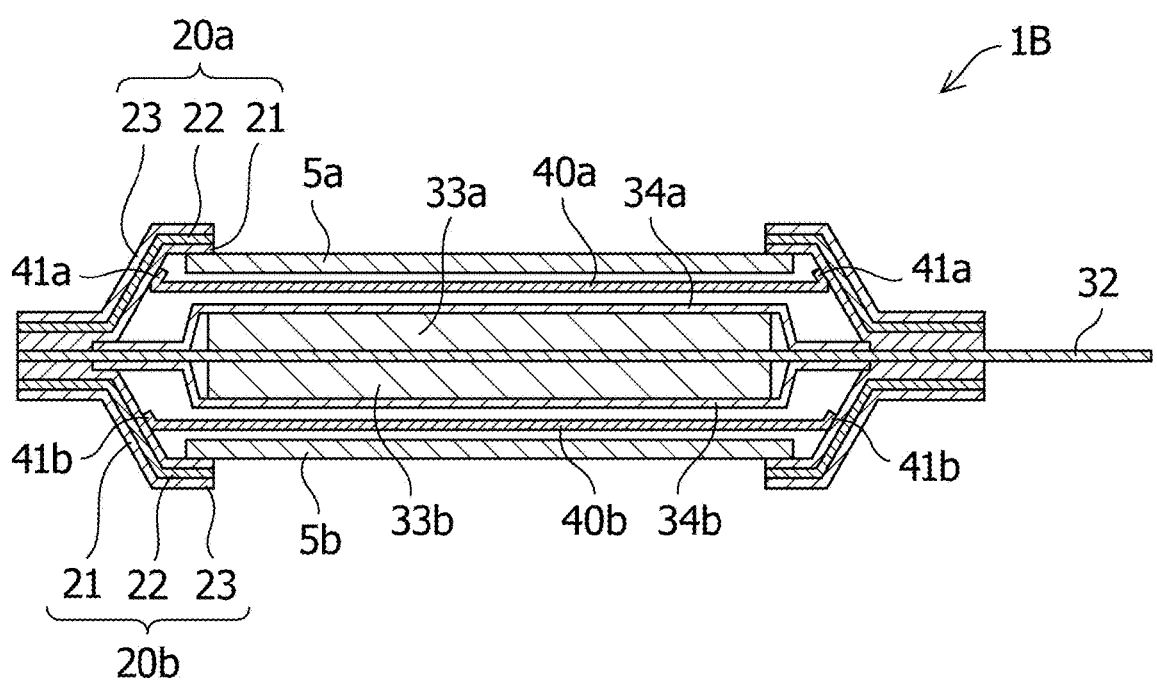
FIG. 5 is a cross-sectional view schematically illustrating a protected anode for a metal-air battery according to a third embodiment.

By use of FIG. 5, a description is provided for a protected anode for an aqueous solution-based lithium-air battery according to a third embodiment. Note that since the present third embodiment is a modified example of the first embodiment (FIGS. 1 to 3), different points are described in detail while omitting overlapping explanation.

As illustrated in FIG. 5, a protected anode 1B of the present third embodiment is provided with anode layers 33a and 33b, first separators 34a and 34b, second separators 40a and 40b, isolation layers 5a and 5b, and metal foil laminate films 20a and 20b on both upper and lower sides in the figure, in which the anode current collector 32 serves as a line of symmetry.

Such a configuration makes it possible to achieve a metal-air battery having a structure in which air electrodes are provided on both surfaces of the protected anode while omitting the film 31 covering the back surface of the anode current collector 32 and the metal foil laminate film 20b covering the back surface of the protected anode 1 in the first embodiment. Hence, it is possible to reduce the volume compared to a metal-air battery having a structure in which a surface of one air electrode is provided so as to face a surface of one protected anode.

FOURTH EMBODIMENT

Figure 6:
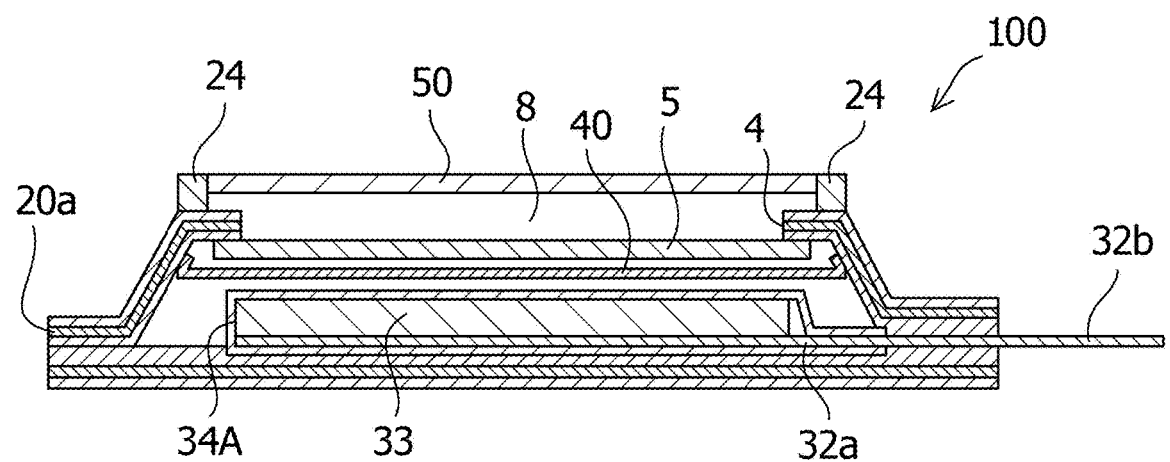
FIG. 6 is a cross-sectional view schematically illustrating a metal-air battery according to a fourth embodiment.

By use of FIG. 6, a description is provided for a protected anode for an aqueous solution-based lithium-air battery according to a fourth embodiment. Note that since the present fourth embodiment uses modified examples of the protected anodes of the first embodiment (FIGS. 1 to 3) and the second embodiment (FIG. 4), different points are described in detail while omitting overlapping explanation.

As illustrated in FIG. 6, an aqueous solution-based lithium-air battery 100 has an air electrode 50 provided on the outer side of the metal foil laminate film 20a to close the opening portion 4. The size of the air electrode 50 in a plan view is larger than the opening portion 4 of the metal foil laminate film 20a, and the peripheral edge portion of the air electrode 50 is secured to the outer peripheral edge portion of the opening portion 4 of the metal foil laminate film 20a by using a support 24. Additionally, the space 8 between the isolation layer 5 and the air electrode 50 has an aqueous solution-based electrolytic liquid sealed therein.

As the air electrode 50, for example, it is possible to use precious metals showing catalytic activity such as platinum, gold, iridium, and ruthenium, an oxide thereof and the like, or e.g. manganese dioxide showing catalytic activity which is mixed with highly conductive carbon and the like as an electric conductive agent and with e.g. polyvinylidene fluoride, polytetrafluoroethylene, or styrene-butadiene rubber as a binder and which is then supported on an air electrode collector having conductivity and gas dispersibility. This air electrode collector can employ, for example, carbon paper, carbon cloth, nonwoven carbon fabric, porous nickel (foamed metal nickel), porous aluminum (foamed metal aluminum), or a metal mesh using a highly anticorrosive metal such as nickel, titanium, and stainless steel. Note that the carbon cloth mentioned here refers to a cloth sheet woven with carbon fibers and the like, and that the nonwoven carbon fabric is a sheet-shaped material made by randomly weaving carbon fibers and the like. Here, in the case of using an aqueous solution-based electrolytic liquid as the electrolytic liquid, the air electrode collector also has to be anticorrosive against the electrolytic liquid. For this reason, it is possible to preferably use carbon fibers and the like which are highly conductive, highly anticorrosive against acidic and alkaline aqueous solutions, and light in weight.

Examples of the electrolyte in the aqueous solution-based electrolytic liquid include lithium salts such as LiCl (lithium chloride), LiOH (lithium hydroxide), $LiNO_3$ (lithium nitrate), and $CH_3COOLi$ (lithium acetate). It is possible to use a liquid in which one or more of these are dissolved.

The support 24 can have the same configuration as the metal foil laminate film being an exterior body of the protected anode. Preferably, the configuration has to be such that the aqueous solution-based electrolytic liquid and the like sealed inside the space 8 do not leak from the lithium-air battery 100 and such that air can be taken in through the air electrode portion.

When the lithium-air battery 100 discharges, the anode layer 33 (metal lithium) disintegrates into lithium ions ($Li^+$) and electrons ($e^-$). Then, the lithium ions ($Li^+$) dissolve into the electrolytic liquid, and the electrons ($e^-$) are supplied via the collector portion 32a of the anode current collector 32 to the terminal portion 32b. Thus, it is possible to control the design value of the battery capacity by changing the thickness and the area of the anode layer 5.

In addition, the air electrode 50 is supplied with electrons, and water and oxygen in the air reacts with each other to produce hydroxide ions ($OH^-$). Moreover, these hydroxide ions ($OH^-$) react with lithium ions ($Li^+$) in the air electrode 50 to form lithium hydroxide (LiOH).

On the other hand, when charging this lithium-air battery 100, in the protected anode, lithium ions supplied from the air electrode 50 pass through the isolation layer 5 of the solid electrolyte and the first and the second separators 34 and 40 to reach the surface of the collector portion 32a of the anode current collector 32. Thus, deposition reaction of metal lithium takes place. Metal lithium is deposited as charging and discharging are repeated over a long period of time. As described above, the second separator 40 suppresses dispersion of this metal lithium and makes it possible to keep the metal lithium near the anode current collector 32. Hence, the charging and discharging cycle characteristic can be improved. Additionally, since it is possible to prevent this deposited metal lithium from reaching the isolation layer 5 being a solid electrolyte, deterioration of the solid electrolyte can be suppressed.

FIFTH EMBODIMENT

Figure 7:
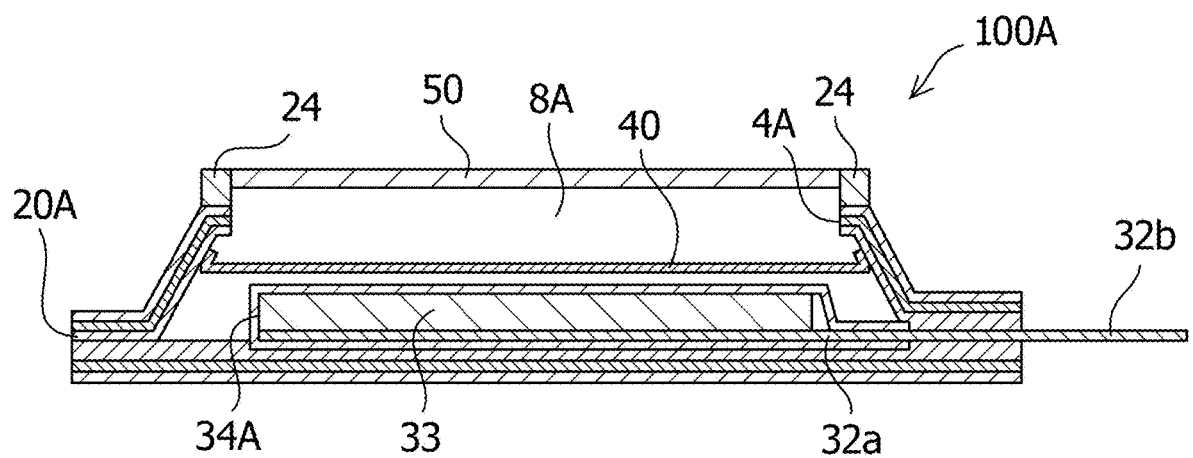
FIG. 7 is a cross-sectional view schematically illustrating a metal-air battery according to a fifth embodiment.

By use of FIG. 7, a description is provided for a non-aqueous solution-based lithium-air battery according to a fifth embodiment. Note that since the present fifth embodiment is a modified example of the fourth embodiment using modified examples of the protected anodes of the first embodiment (FIGS. 1 to 3) and the second embodiment (FIG. 4), different points are described in detail while omitting overlapping explanation.

As illustrated in FIG. 7, a non-aqueous solution-based lithium-air battery 100A employs a protected anode without the isolation layer 5 (solid electrolyte). In other words, the second separator 40 is provided on the inner side of the metal foil laminate film 20A having the opening portion 4A in a way to close the opening portion 4A. Regarding the configuration, the opening portion 4A is provided in the metal foil laminate film 20A under substantially the same conditions as the embodiments described above. Additionally, the space 8A between the second separator 40 and the air electrode 50 has an organic electrolytic liquid as in the case of the inside of the protected anode.

Although metal lithium is deposited in the non-aqueous solution-based lithium-air battery 100A as in the case of the aqueous solution-based lithium-air battery 100 if charging and discharging are repeated over a long period of time, the second separator 40 can suppress the dispersion of this deposited metal lithium as described above and keep the deposited metal lithium near the anode current collector 32. Thus, such a configuration makes it possible to improve the charging and discharging cycle characteristic. In addition, since it is possible to prevent this deposited metal lithium from reaching the air electrode 50, it is possible to suppress short circuiting between the air electrode 50 and the anode current collector 32.

OTHER EMBODIMENTS

The description of the above-described embodiments is an example for the purpose of explaining the metal-air battery and a protected anode used therein according to the present invention and is not intended to limit the invention described in the scope of claims. In addition, the components of the present invention are not limited to the embodiments described above and are capable of various modifications within the technical scope described in the scope of claims.

For example, regarding the protected anode exterior of the protected anode 1 shown in the first embodiment, it is possible to use a heat-resistant and high-strength resin sheet made of e.g. a nylon-based resin or a polyester-based resin such as a polyethylene terephthalate resin, covering the entire back surface of the anode current collector 32, instead of using the metal foil laminate film 20b on the lower side in the figure. This makes it possible to suppress dendrite formation on the back surface of the anode current collector 32 and at the same time to reduce the thickness and the weight by reducing the number of components.

In addition, in the above embodiments, the anode layer 33, the collector portion 32 of the anode current collector, the isolation layer 5 being the solid electrolyte, and the like do not have to be rectangular or square in shape, for example, and can be modified in various shapes such as circular and polygonal according to the purpose of use. Moreover, the anode layer 33 may have more than one layer. Furthermore, the protected anode does not necessarily have to be in the shape of a flat plate and can be modified according to the usage purpose. For example, the shape may be three-dimensional.

EXAMPLE

An aqueous solution-based lithium-air battery employing a protected anode having the same configuration shown in FIG. 1 was fabricated, and a charging and discharging test was carried out on this battery.

[Fabrication of Protected Anode]

First, as in the case of an Example, a protected anode was fabricated by placing an exterior material which is a PP resin/Al foil/PET resin metal foil laminate film having a center portion punched in 2 square centimeters, an acid-modified polypropylene film punched product (outer peripheral portion: 3 square centimeters; inner periphery: 2 square centimeters), a 2.5-square-centimeter solid electrolyte (LATP), and an acid-modified polypropylene film punched product (outer peripheral portion: 3 square centimeters; inner periphery: 2 square centimeters) in this order. Four sides of the solid electrolyte were joined by heat sealing with a heat sealer to make an upper exterior body.

The solid electrolyte on the inner side (anode side) of this upper exterior body was covered with a PP resin separator for a lithium-ion battery (corresponds to the second separator), and the four sides of the separator were joined by heat sealing while leaving a gas outlet hole of about 7 mm. After that, the resultant was moved inside a glove box under an argon atmosphere. Metal Li foil (size: 1.45×1.4 cm, thickness: 0.2 mm) was joined to the central portion of the front surface of a two-square-centimeter portion of the tip end portion of the copper foil (copper foil thickness: 10 µm, collector size: 2×7 cm) having a set of a terminal and an anode current collector the back surface of which is joined with a polypropylene film. The resultant was covered with a PP resin separator for a lithium-ion battery (first separator), and the four sides being edge portions were joined by heat sealing at a portion in which the polypropylene on the back surface of the anode current collector was joined. The resultant was formed into a single unit as an anode. The upper exterior body, the anode as a single unit, and the metal foil laminate film of lower exterior body (without an opening portion) were placed on each other so that the solid electrolyte portion would face the anode surface, and then three sides being the edge portions were joined by heat sealing with a heat sealer.

Then, 1 ml of a non-aqueous solution-based electrolytic liquid (4 M (mol/l) LiFSI/EGDME) was injected through the unjoined edge portion into the protected anode. After the gas inside the exterior body was let out, the remaining one side being an edge portion (portion having a tab of the anode current collector) was finally joined with a heat sealer for leak-proof, completing the fabrication of the protected anode. The anode current collector and the upper and lower exterior bodies were heat-sealed using a heat sealing sheet made of e.g. an acid-modified PP resin. Note that LATP (OHARA INC.) was used as the solid electrolyte. In addition, the separator for a lithium-ion battery used was one made of a polypropylene resin and having a thickness of 25 µm, an average pore diameter of 0.03 µm or less, a porosity of 44%, and a permeability of 450 sec/100 cc.

[Fabrication of Air Electrode]

The air electrode (cathode) was fabricated in the following procedures.

(1) A cathode material was fabricated by measuring and weighing 0.8 g of $MnO_2$ (specific surface area of 300 $m^2/g$) having catalytic activity as a cathode catalyst, 0.1 g of Ketjenblack (specific surface area of 800 $m^2/g$) as an electric conductive agent, and 0.1 g of polytetrafluoroethylene (PTFE) dispersion liquid as a binder and by moving these to an agate mortar followed by addition of 5 ml of ethanol as a dispersant for kneading.

(2) The cathode was fabricated by dividing the above cathode material in two equal portions, which were then provided on both surfaces of a compression bonding portion of a Ti-mesh formed by combining a 2.5-square-centimeter compression bonding portion and a tab portion having the size of 1×5.5 cm, and by performing compression bonding with a pressing force of 20 kN, followed by air-dry for 24 hours.

[Fabrication of Metal-Air Battery]

The aqueous solution-based electrolytic liquid on the cathode side was prepared such that pH was 10 or less by using a mixture liquid of LiOH and LiCl. In order to retain an aqueous solution of LiOH, 1.5 ml was added dropwise onto a three-square-centimeter sheet of polyacrylamide, which was provided between the cathode and the protected anode. In this way, a cell corresponding to 84 mAh was fabricated.

[Fabrication of Metal-Air Battery of Comparative Example]

A description is provided for a method of fabricating a protected anode employing a conventional laminate film as a comparative example. First, as in the case of the Example, a protected anode was fabricated by placing an exterior material which is a PP resin/Al foil/PET resin metal foil laminate film having a center portion punched in 2 square centimeters, an acid-modified polypropylene film punched product (outer peripheral portion: 3 square centimeters; inner periphery: 2 square centimeters), a solid electrolyte (LATP) in 2.5 square centimeters, and an acid-modified polypropylene film punched product (outer peripheral portion: 3 square centimeters; inner periphery: 2 square centimeters) in this order. Four sides of the solid electrolyte were joined by heat sealing with a heat sealer to make an upper exterior body.

After that, the resultant was moved inside a glove box under an argon atmosphere. Metal Li foil (size: 1.45×1.4 cm, thickness: 0.2 mm) was joined to the front surface center portion of a two-square-centimeter portion of the tip end portion of the copper foil (copper foil thickness: 10 µm, collector size: 2×7 cm) having a set of a terminal and an anode current collector the back surface of which is joined with a polypropylene film. The resultant was covered with a PP resin separator for a lithium-ion battery, and the four sides being edge portions were joined by heat sealing at a portion in which the polypropylene on the back surface of the anode current collector was joined. The resultant was formed into a single unit as an anode.

The upper exterior body, the anode as a single unit, and the metal foil laminate film of lower exterior body (without an opening portion) were placed on each other so that the solid electrolyte portion would face the anode surface, and then three sides being the edge portions were joined by heat sealing with a heat sealer. Then, 1 ml of a non-aqueous electrolytic liquid (4 M (mol/l) LiFSI/EGDME) was injected through the unjoined edge portion into the protected anode. After the gas inside the exterior body was let out, the remaining one side being an edge portion (portion having a tab of the anode current collector) was finally joined with a heat sealer for leak-proof, completing the fabrication of the protected anode. The resultant was assembled with an air electrode fabricated in the same method as in Example to fabricate a metal-air battery in the same method as in the Example.

[Charging and Discharging Test]

Figure 8A:
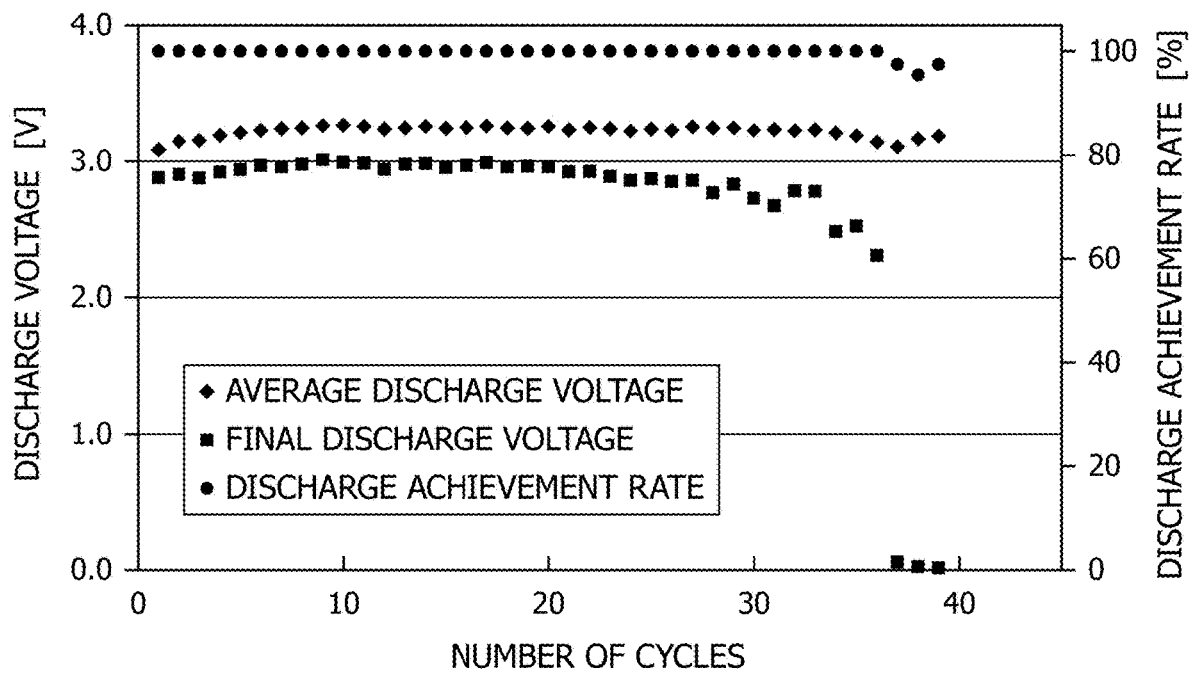
FIGS. 8A and 8B provide graphs illustrating a relationship among the number of cycles, an average voltage, and a final voltage for charging and discharging, according to a metal-air battery in an example.
Figure 8B:
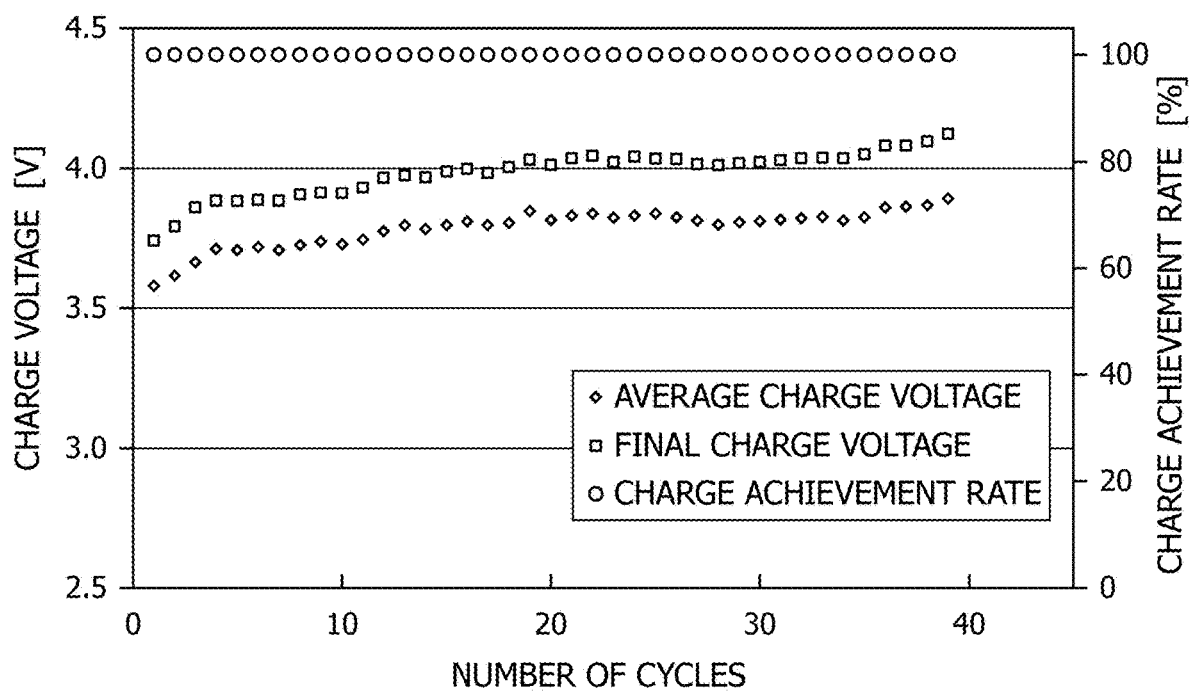
Figure 9A:
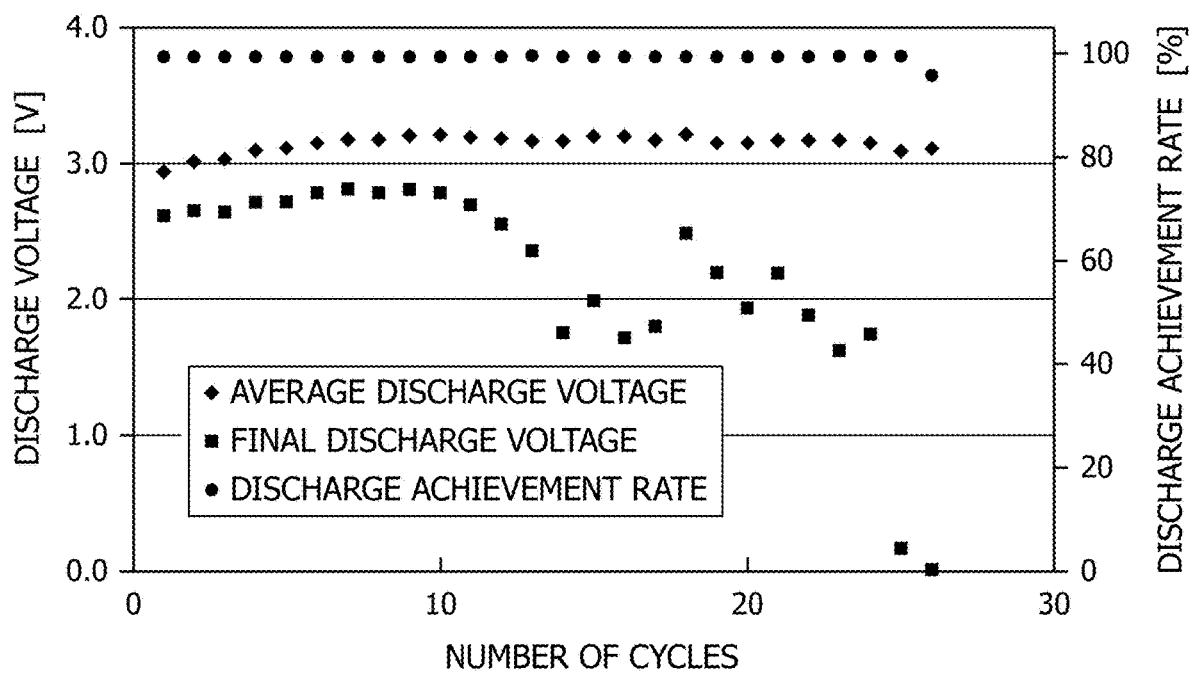
FIGS. 9A and 9B provide graphs illustrating a relationship among the number of cycles, an average voltage, a final voltage, and time for charging and discharging, according to a metal-air battery in a comparative example.
Figure 9B:
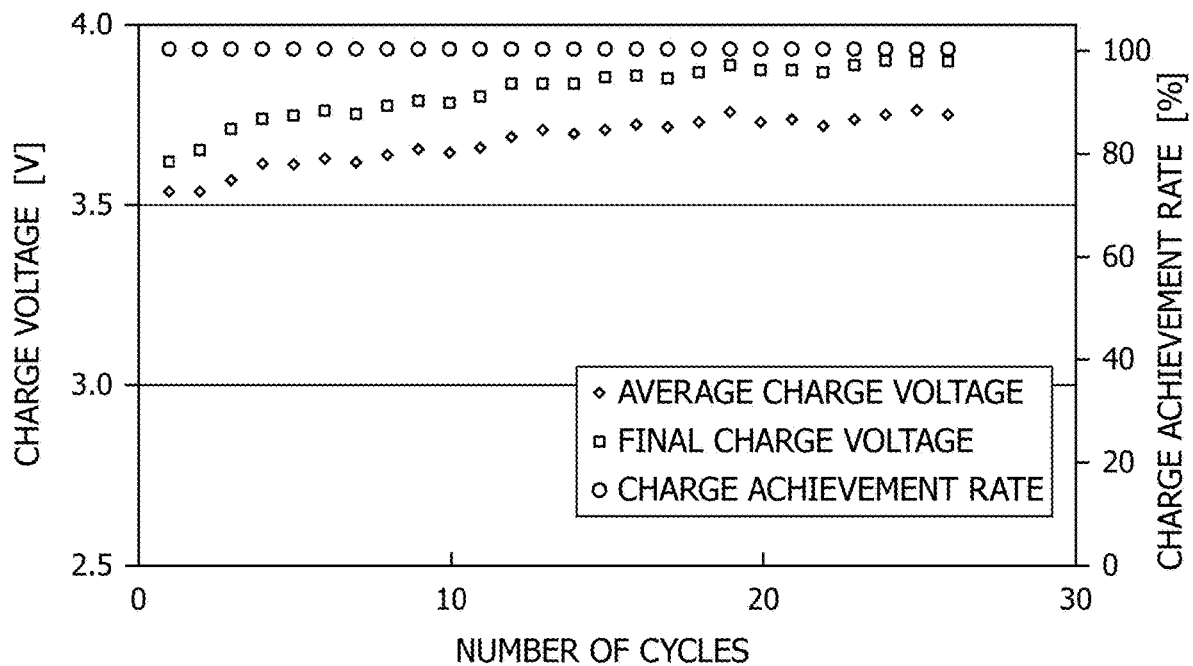

The cell (Example) corresponding to 84 mAh fabricated according to the foregoing description was discharged for 6 hours at 4 mA (corresponding to a current density of 2 mA/cm$^2$) and was adjusted to an anode capacity equal to 70% of the theoretical capacity. After that, HJ1001SD8, manufactured by HOKUTO DENKO CORP., was used at a temperature of 25° C. to measure a voltage transition when charging and discharging (anode capacity range of 70% to 90%) were repeated for 4 hours at 4 mA (corresponding to a current density of 2 mA/cm$^2$). FIGS. 8A and 8B show the results. In addition, for the purpose of comparison, the same test was carried out on the cell of the comparative example. FIGS. 9A and 9B show the results. As illustrated in FIGS. 9A and 9B, discharging was stopped at 26th cycle in the comparative example. On the other hand, as illustrated in FIGS. 8A and 8B, discharging continued until the 37th cycle in the Example, proving that the charging and discharging cycle characteristics were greatly improved.

Figure 10:
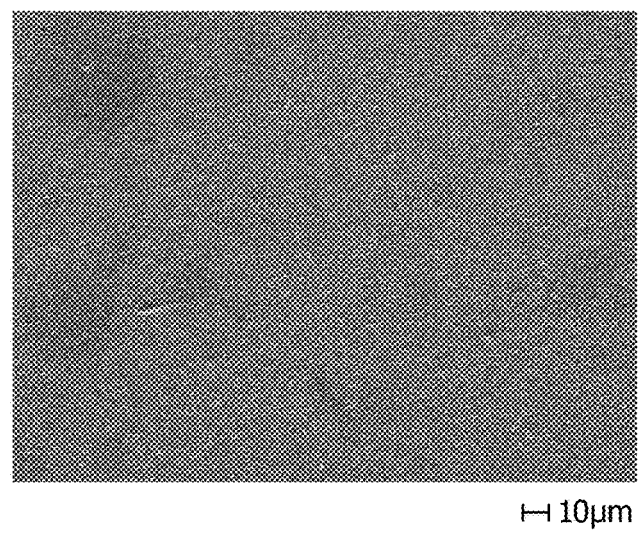
FIG. 10 is an electron micrograph showing a surface of a solid electrolyte after discharging and charging cycle testing of the example, taken with an electron microscope.
Figure 11:
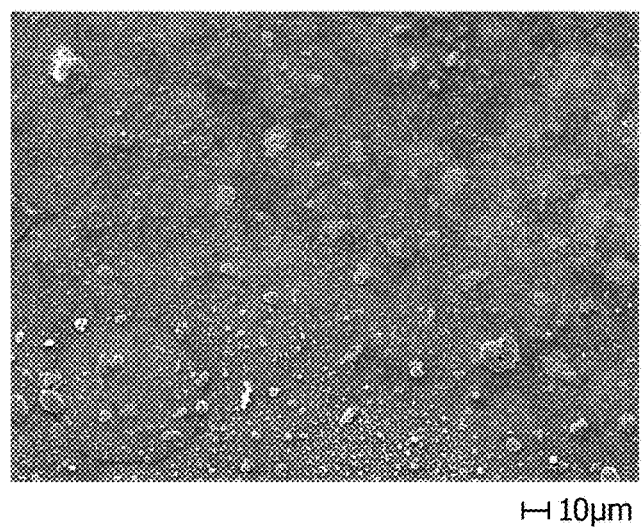
FIG. 11 is a an electron micrograph showing a surface of a solid electrolyte after discharging and charging cycle testing of the comparative example, taken with an electron microscope.
Figure 12:
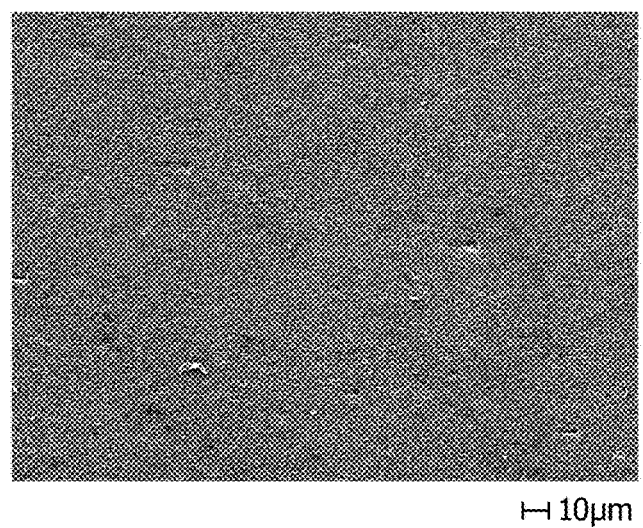
FIG. 12 is an electron micrograph showing a surface of an unused solid electrolyte, taken with an electron microscope.

Additionally, the solid electrolyte was taken out of the cell after the charging and discharging test described above, and an observation was carried out on the surface on the anode side using an electron microscope. FIG. 10 (Example) and FIG. 11 (Comparative Example) show the results. Note that for reference, FIG. 12 shows a photo of the surface of an unused solid electrolyte, taken by a microscope. FIG. 10 to FIG. 12 show that the surface of the solid electrolyte of Example was almost the same as the unused one, but the surface of the solid electrolyte of the comparative example experienced deterioration to a great extent.

REFERENCE SIGNS LIST 1 protected anode
2 exterior body
3a pressure relieving space
4 opening portion
5 isolation layer
6 pore
9 opening
20 metal foil laminate film
21 first resin layer
22 metal foil layer
23 second resin layer
30 anode stacked body
31 film
32 anode current collector
33 anode layer
34 first separator
40 second separator
50 air electrode
100 metal-air battery

The invention claimed is:

1. A protected anode for a metal-air battery, comprising:
an anode current collector;
an anode layer which is stacked on an air electrode side of the anode current collector and which includes a metal being an anode active material of a metal-air battery;
a first separator which is stacked on the air electrode side of the anode layer and which includes multiple pores permeable to ions of the metal and an organic electrolytic liquid; and
a second separator which is provided on the air electrode side of the first separator so as to be movable relative to the first separator in an inter-electrode direction and which includes multiple pores permeable to the metal ions and the organic electrolytic liquid.

2. The protected anode according to claim 1, which is formed by sealing the anode layer with the anode current collector and the first separator.

3. The protected anode according to claim 1, wherein the second separator is provided at a distance from the first separator.

4. The protected anode according to claim 1, wherein at least some of the multiple pores in the second separator are provided at positions not in alignment with the multiple pores in the first separator.

5. The protected anode according to claim 1, further comprising a resin sheet which is stacked on an opposite side of the anode current collector from the air electrode and which is resistant to the organic electrolytic liquid.

6. The protected anode according to claim 1, further comprising a solid electrolyte on the air electrode side of the second separator, wherein the second separator includes an opening which allows gas to pass therethrough.

7. The protected anode according to claim 1, wherein the anode layer is stacked on either side of the anode current collector, the first separator is stacked on an outer side of each of these two anode layers, the second separator is provided on an outer side of each of these two first separators, and the protected anode further comprises a solid electrolyte on an outer side of each of these two second separators.

8. A metal-air battery comprising:
the protected anode according to claim 1; and
an air electrode.

9. The metal-air battery according to claim 8, wherein the protected anode is formed by sealing the anode layer with the anode current collector and the first separator.

10. The metal-air battery according to claim 8, wherein the second separator is provided at a distance from the first separator.

11. The metal-air battery according to claim 8, wherein at least some of the multiple pores in the second separator are provided at positions not in alignment with the multiple pores in the first separator.

12. The metal-air battery according to claim 8, wherein the protected anode further comprises a resin sheet which is stacked on an opposite side of the anode current collector from the air electrode and which is resistant to the organic electrolytic liquid.

13. The metal-air battery according to claim 8, wherein the protected anode further comprises a solid electrolyte on the air electrode side of the second separator, and the second separator includes an opening which allows gas to pass therethrough.

14. The metal-air battery according to claim 8, wherein the anode layer is stacked on either side of the anode current collector, the first separator is stacked on an outer side of each of these two anode layers, the second separator is provided on an outer side of each of these two first separators, and the protected anode further comprises a solid electrolyte on an outer side of each of these two second separators.

\* \* \* \* \*